United States Patent
Fujiwara et al.

(10) Patent No.: US 7,762,021 B2
(45) Date of Patent: Jul. 27, 2010

(54) DOOR SASH FOR VEHICLE AND METHOD OF MANUFACTURING THE SAME (75) Inventors: Tsuyoshi Fujiwara, Ibara (JP); Yoshihiro Manabe, Ibara (JP); Taishi Ogawa, Wakou (JP); Yoshiaki Meguro, Wakou (JP)

(73) Assignees: Katayama Kogyo Co., Ltd., Okayama (JP); Honda Giken Kogyo Co., Ltd., Tokyo (JP)

( * ) Notice: Subject to any disclaimer, the term of this patent is extended or adjusted under 35 U.S.C. 154(b) by 505 days.

(21) Appl. No.: 10/554,832

(22) PCT Filed: Oct. 19, 2004

(86) PCT No.: PCT/JP2004/015398

§ 371 (c)(1),
(2), (4) Date: Oct. 28, 2005

(87) PCT Pub. No.: WO2005/056321

PCT Pub. Date: Jun. 23, 2005

(65) Prior Publication Data
US 2007/0048543 A1  Mar. 1, 2007

(30) Foreign Application Priority Data
Dec. 10, 2003  (JP)  ............................... 2003-411244

(51) Int. Cl.
*B60J 5/04* (2006.01)
(52) U.S. Cl. ........................... 49/502; 49/506; 49/440; 29/897.2; 29/509

(58) Field of Classification Search .................. 49/502, 49/506, 428, 440, 441, 442, 296; 29/897.2, 29/451, 509; 296/146.2
See application file for complete search history.

(56) References Cited

U.S. PATENT DOCUMENTS 1,663,518 A * 3/1928 Ledwinka .................... 49/166

(Continued)

FOREIGN PATENT DOCUMENTS

JP          9-29373 A       2/1997

(Continued)

OTHER PUBLICATIONS

Dictionary.com definition of crushing http://dictionary.reference.com/browse/crushing.*

(Continued)

*Primary Examiner*—Katherine W Mitchell
*Assistant Examiner*—Catherine A Kelly
(74) *Attorney, Agent, or Firm*—Osha • Liang LLP (57) ABSTRACT A vehicular door sash includes a sash frame formed by subjecting a predetermined metal sheet to a roll molding process to have a predetermined cross section. The sash frame includes a groove portion for retaining a glass-run channel, a retainer portion for retaining a weather strip, a flange portion that connects the retainer portion and the groove portion and partially forms an outer surface of a door of a vehicle, and a sash molding configured to cover the flange portion. The flange portion has a first configuration in which the flange portion is not covered by the sash molding and a second configuration in which the flange portion is covered and compressed by the sash molding.

2 Claims, 7 Drawing Sheets

U.S. PATENT DOCUMENTS

| | | | | |
|---|---|---|---|---|
| 2,726,894 | A | * | 12/1955 | Bugbee .................... 49/441 |
| 3,089,233 | A | * | 5/1963 | Meier ..................... 29/459 |
| 4,454,688 | A | * | 6/1984 | Rest et al. ................ 49/502 |
| 4,694,611 | A | * | 9/1987 | Okumura .................. 49/441 |
| 4,823,511 | A | * | 4/1989 | Herliczek et al. ........... 49/404 |
| 4,903,436 | A | * | 2/1990 | Rouillard .................. 49/440 |
| 4,949,507 | A | * | 8/1990 | Vaughan ................. 49/482.1 |
| 5,038,521 | A | * | 8/1991 | Andrzejewski et al. ....... 49/441 |
| 5,107,624 | A | * | 4/1992 | Passone ................... 49/502 |
| 5,150,542 | A | * | 9/1992 | Hannya et al. .............. 49/441 |
| 5,163,248 | A | * | 11/1992 | Bielis et al. ............... 49/441 |
| 5,191,695 | A | * | 3/1993 | Pavely et al. .............. 29/451 |
| 5,732,509 | A | * | 3/1998 | Buehler et al. ............. 49/502 |
| 5,884,722 | A | * | 3/1999 | Durand et al. ............. 180/312 |
| 5,983,571 | A | * | 11/1999 | Takeda et al. .............. 49/502 |
| 5,992,021 | A | * | 11/1999 | Takeda et al. ............. 29/897.2 |
| 6,016,630 | A | * | 1/2000 | Takeda et al. .............. 49/502 |
| 6,119,405 | A | * | 9/2000 | Disson et al. .............. 49/502 |
| 6,205,712 | B1 | * | 3/2001 | Ellis ....................... 49/441 |
| 6,370,824 | B1 | * | 4/2002 | Keeney et al. ............... 49/441 |
| 6,416,113 | B1 | * | 7/2002 | Page ..................... 296/146.2 |
| 6,493,992 | B2 | * | 12/2002 | Goto ...................... 49/441 |
| 6,557,304 | B2 | * | 5/2003 | Ellis ....................... 49/441 |
| 6,679,003 | B2 | * | 1/2004 | Nozaki et al. .............. 49/441 |
| 6,996,936 | B1 | * | 2/2006 | Maass .................... 49/479.1 |
| 7,055,285 | B2 | * | 6/2006 | Nozaki ................... 49/479.1 |
| 7,316,097 | B2 | * | 1/2008 | Shiraiwa et al. ............ 49/441 |
| 2001/0001917 | A1 | * | 5/2001 | Goto ...................... 49/440 |
| 2001/0013203 | A1 | * | 8/2001 | Griesbach et al. ........... 49/440 |
| 2001/0015035 | A1 | * | 8/2001 | Nozaki ..................... 49/440 |
| 2002/0108313 | A1 | * | 8/2002 | Nozaki et al. .............. 49/441 |

FOREIGN PATENT DOCUMENTS

| | | |
|---|---|---|
| JP | 11-192842 | 7/1999 |
| JP | 11-347637 A | 12/1999 |

OTHER PUBLICATIONS

ISA/JP, International Search Report, PCT/JP2004/015398, Dec. 14, 2004, 1 page.

English Patent Abstract of JP9029373 from esp@cenet, published Feb. 4, 1997, 1 page.

English Patent Abstract of JP11347637 from esp@cenet, published Dec. 21, 1999, 1 page.

English abstract of patent application with Publication No. JP11192842 from esp@cenet, Publication date: Jul. 21, 1999, 1 page.

* cited by examiner

DOOR SASH FOR VEHICLE AND METHOD OF MANUFACTURING THE SAME

FIELD OF THE INVENTION

This invention relates to a vehicular door sash provided with a sash molding for covering a flange portion that forms a design part of the vehicular door sash, and to a manufacturing method of the vehicular door sash, in which the sash frame having a predetermined cross section is subjected to an additional simple molding process so as to form the vehicular door sash.

DESCRIPTION OF THE RELATED ART

Figure 7:
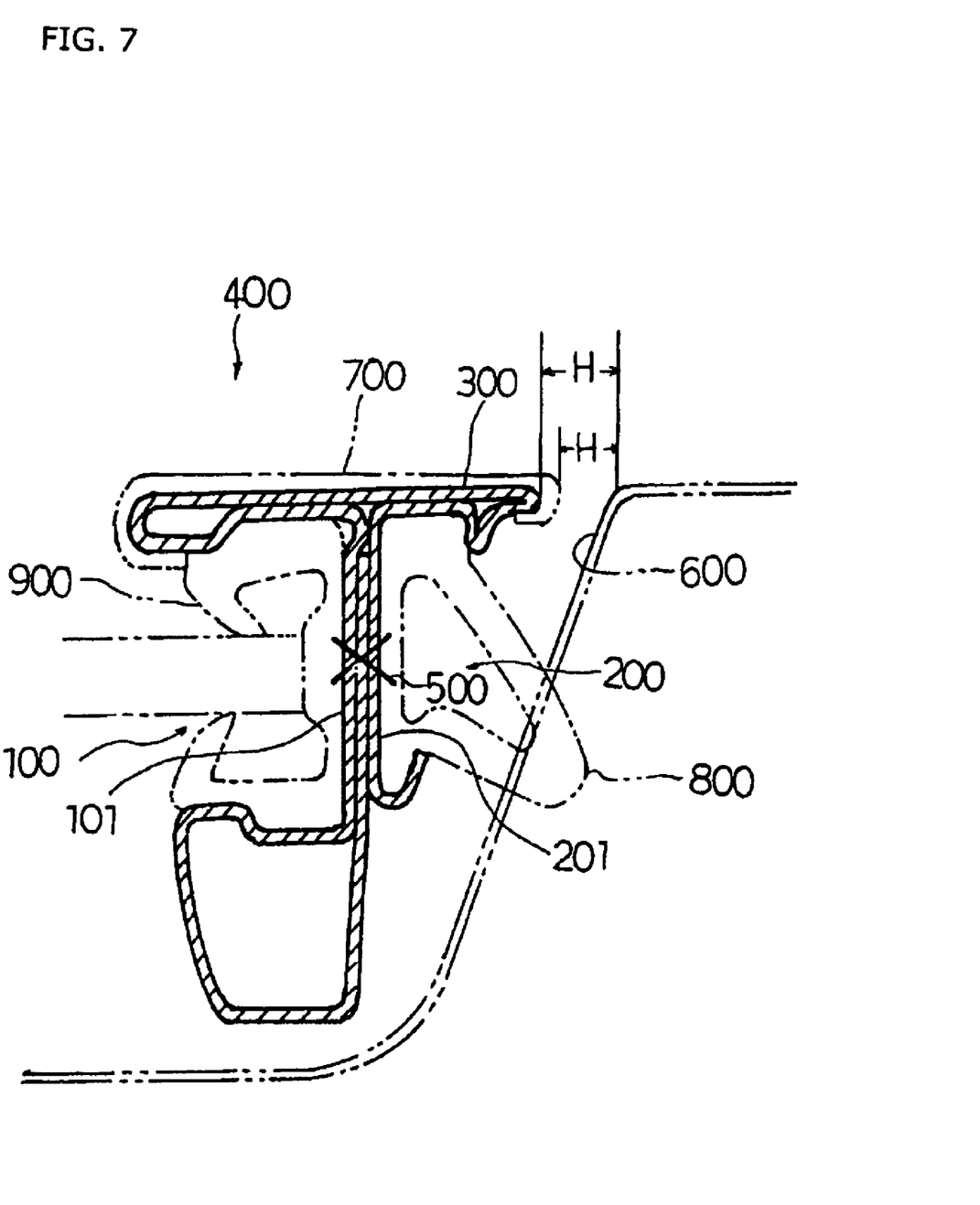
FIG. 7 is a cross section that represents the positional relationship between a door sash of conventional type and a door stop of the vehicle body

As has been disclosed in publication of Kokai No. 11-192842 or shown in FIG. 7, the vehicular door sash is manufactured using a sash frame 400 which includes a groove portion 100 that retains a glass-run channel 900, a retainer portion 200 provided on a back surface of the groove portion 100, with which a weather strip 800 is fit, and a flange portion 300 provided between the groove portion 100 and the retainer portion 200 for forming a part of an outer surface of the door. A single metal sheet is used for integrally forming the sash frame 400 through a roll molding process such that bottom portions 101 and 201 of the groove portion 100 and the retainer portion 200 are fused through spot welding means 500. A door sash assembly is, thus, formed using the aforementioned sash frame 400. The door for the vehicle is produced by assembling the door sash assembly with the door panel body.

Publication 1: Kokai No. 11-192842

DISCLOSURE OF THE INVENTION

Description of Conventional Art

It may be the case that the vehicular door sash as aforementioned is provided with a decorative sash molding 700 on the flange portion 300. More specifically, the vehicle model has two types, a lower-cost type provided with no sash molding, and a luxury type provided with the sash molding 700. In the case where the same sash frame is used for manufacturing both types of the door sash, that is, the door sash with the sash molding and the door sash with no sash molding, a gap (H) formed between the outer frame of the flange portion 300 of the door sash with the sash molding and a door stop 600 of a pillar or a roof is different from that in case of the door sash with no sash molding as shown in FIG. 7. If the gap (H) is set to the value conforming to the luxury type of the door sash with the sash molding 700, the value of the gap (H) formed upon manufacturing of the lower-cost type of the door sash with no sash molding 700 becomes larger than that of the luxury type, resulting in deteriorated appearance. It is possible to produce the sash frame for manufacturing the door sash of the lower-cost type separately from the luxury type through the roll molding process for the purpose of forming the appropriate gap (H). The resultant manufacturing cost as a whole, however, may be increased, resulting in little practicability. It is an object of the invention to provide a vehicular door sash and a method of manufacturing the vehicular door sash, in which a flange portion of a sash frame having a predetermined cross section is subjected to an additional molding process to form an engagement portion in a part of the flange portion such that the sash molding is attached to the engagement portion.

MEANS FOR SOLVING THE PROBLEM

Embodiments of the second invention as will be described with respect to a vehicular door sash formed of a sash frame produced by subjecting a predetermined metal sheet to a roll molding process to have a predetermined cross section. The sash frame includes a groove portion for retaining a glass-run channel, a retainer portion for retaining a weather strip, which is provided on a back surface of the groove portion and has its bottom surface in contact with a bottom surface of the groove portion, and a flange portion that connects the retainer portion and the groove portion and partially forms an outer surface of a door of a vehicle. An end portion of the flange portion of the sash frame at a side of the groove portion is formed to have an engagement portion having a cross section directed upward through roll molding means such that a sash molding is attached to the engagement portion for covering the flange portion.

Embodiments of the second invention as will be described with respect to a manufacturing process of a vehicular door sash comprising the steps of a sash frame molding step of processing a predetermined metal sheet through roll molding means into a sash frame having a predetermined cross section including a groove portion for retaining a glass-run channel, a retainer portion for retaining a weather strip, which is provided on a back surface of the groove portion and has its bottom surface in contact with a bottom surface of the groove portion, and a flange portion that connects the retainer portion and the groove portion, and partially forms an outer surface of a door of a vehicle, and an additional molding step of forming a protruding portion that holds the glass-run channel and an engagement portion engaged with a sash molding at the flange portion of the sash frame that has been produced in the sash frame molding step.

The additional step is formed of a compressing step of compressing a part of a surface of the flange portion through a predetermined roller, and a bending step of bending a portion of the flange portion that has been compressed in the compressing step so as to form the protruding portion and the engagement portion.

EFFECT OF THE INVENTION

According to the first invention, the protruding portion is formed on the flange portion of the sash frame having the predetermined cross section directed to the groove portion where the glass-run channel is retained through the simple roll molding process. The thus formed protruding portion makes sure to retain the glass-run channel in the groove portion. In this way, the sash frame having the predetermined cross section may be used to form the vehicular door sash having the protruding portion for holding the glass-run channel, resulting in efficient manufacturing of the vehicular door sash.

Further the protruding portion for holding the glass-run channel is formed, a tip end of the flange portion of the sash frame at the side of the groove portion is bent upward through the simple roll molding process. The thus bent portion serves as an engagement portion with which the sash molding is attached. Accordingly, the sash frame having the predetermined cross section may be used to form the vehicular door sash provided with the sash molding as well as the vehicular door sash with no sash molding through the relatively simple process, resulting in reduced cost for manufacturing the vehicular door sash with the sash molding. It is possible to form the protruding portion and the engagement portion on the sash frame having the predetermined cross section such that the flange portion may be formed accurately enough to have the sash molding assembled therewith. This makes it possible to efficiently manufacture the vehicular door sash with the sash molding with enhanced assembly accuracy.

According to the second invention, the manufacturing method includes a sash frame molding step of forming the sash frame having the predetermined cross section, and an additional molding step of forming the sash frame to have the protruding portion that holds the glass-run channel and the engagement portion that contributes the attachment of the sash molding with the flange portion through the roll molding means. This makes it possible to efficiently manufacture the vehicular door sash with the sash molding at the reduced manufacturing costs. The manufacturing method allows both types of the vehicular door sash, the one with the sash molding and the other with no sash molding, to be formed from the same sash frame. This makes it possible to efficiently manufacture two types of the vehicular door sash each having different width of the flange portion.

The additional step is formed of a compressing step applied to a part of the surface of the flange portion, and a bending step that bends a part of the flange portion so as to reduce the width thereof. The vehicular door sash with the sash molding may be efficiently manufactured using the sash frame for forming the vehicular door sash with no sash molding through the additional molding step performed subsequent to the molding step of the sash frame for forming the door sash with no sash molding. Accordingly two types of the vehicular door sash each having a different width of the flange portion may be efficiently manufactured at reduced manufacturing costs.

DETAILED DESCRIPTION OF PREFERRED EMBODIMENTS

Figure 1:
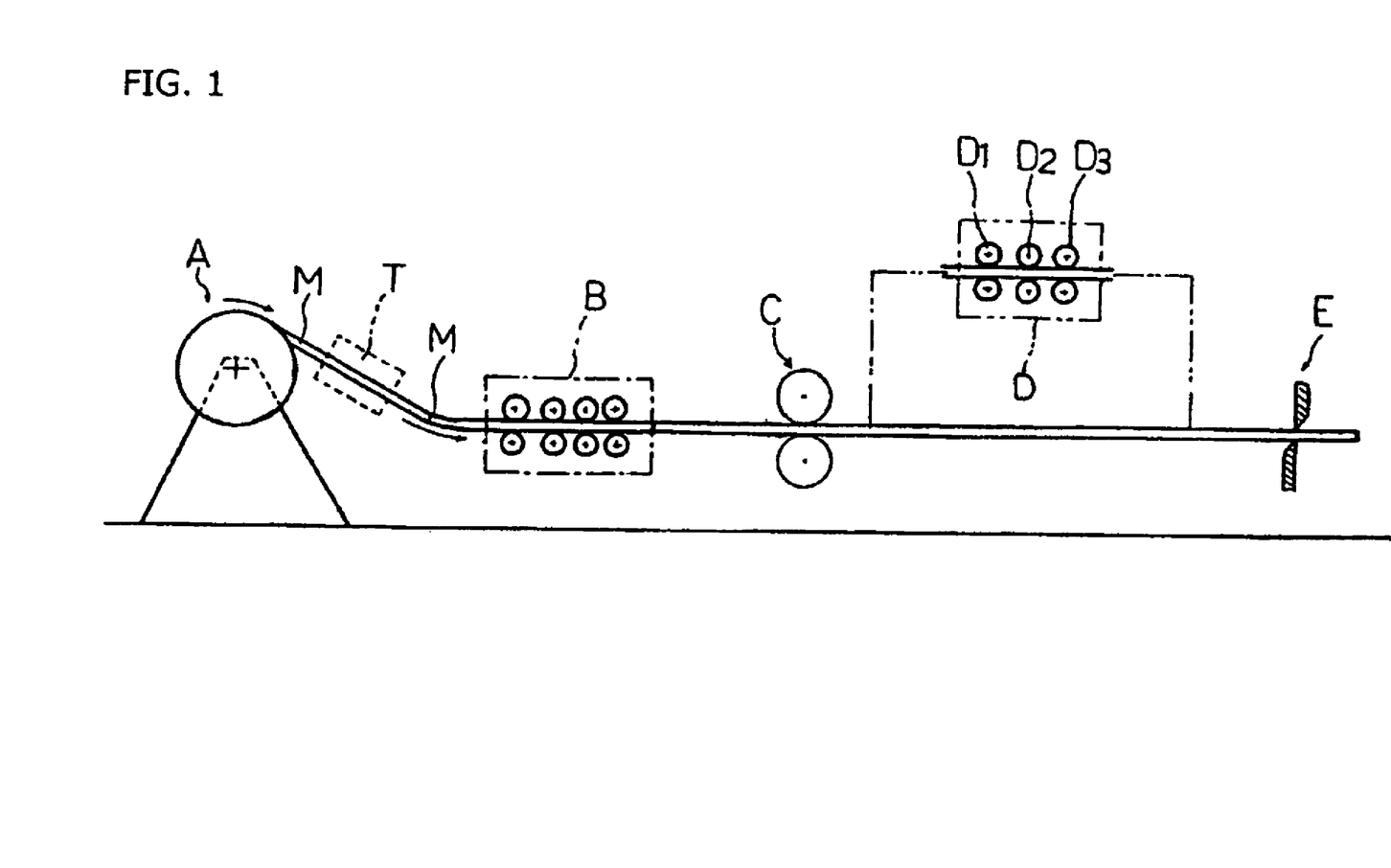
FIG. 1 is a view showing a manufacturing process of a sash frame according to the invention.

Embodiments of the invention will be described referring to FIGS. 1 to 6. A manufacturing (molding) method of a sash frame basically used for producing the vehicular door sash will be described hereinafter referring to FIG. 1. The manufacturing process (step) shown in FIG. 1 is performed through various units including:

an uncoiler unit A that uncoils a strip sheet M, that is, a single metal sheet (strip sheet formed of cold rolling steel) from a coil around which the strip sheet M is wound;

a feed unit T that feeds the strip sheet M uncoiled by the uncoiler unit A to the next step;

a first roll molding unit B that includes rollers through which the strip sheet M that has been continuously fed in an arrowed direction by the feed unit T is formed into a first sash frame 10 as a base;

a welding unit C that applies a spot welding to a predetermined position of the sash frame which has been roll molded through the first roll molding unit B so as to keep its cross section constant; and a cutting unit E that cuts the first sash frame 10 that has been spot welded through the welding unit C into a piece having a predetermined length.

An additional molding step basically used for manufacturing the vehicular door sash with the sash molding is added between the welding unit C and the cutting unit E as indicated by a chain double-dashed line of FIG. 1, through which a second sash frame 20 having the flange width reduced is produced. Referring to FIG. 1, the additional molding step is performed through a second roll molding unit D including a plurality of rollers D1, D2 and D3. The thus provided additional molding step performed through the second roll molding unit D makes it possible to efficiently produce the second sash frame 20 (sash frame used for manufacturing the vehicular door sash provided with the sash molding) having the width of the flange portion smaller than that of the flange portion of the first sash frame 10.

First Embodiment

Figure 2:
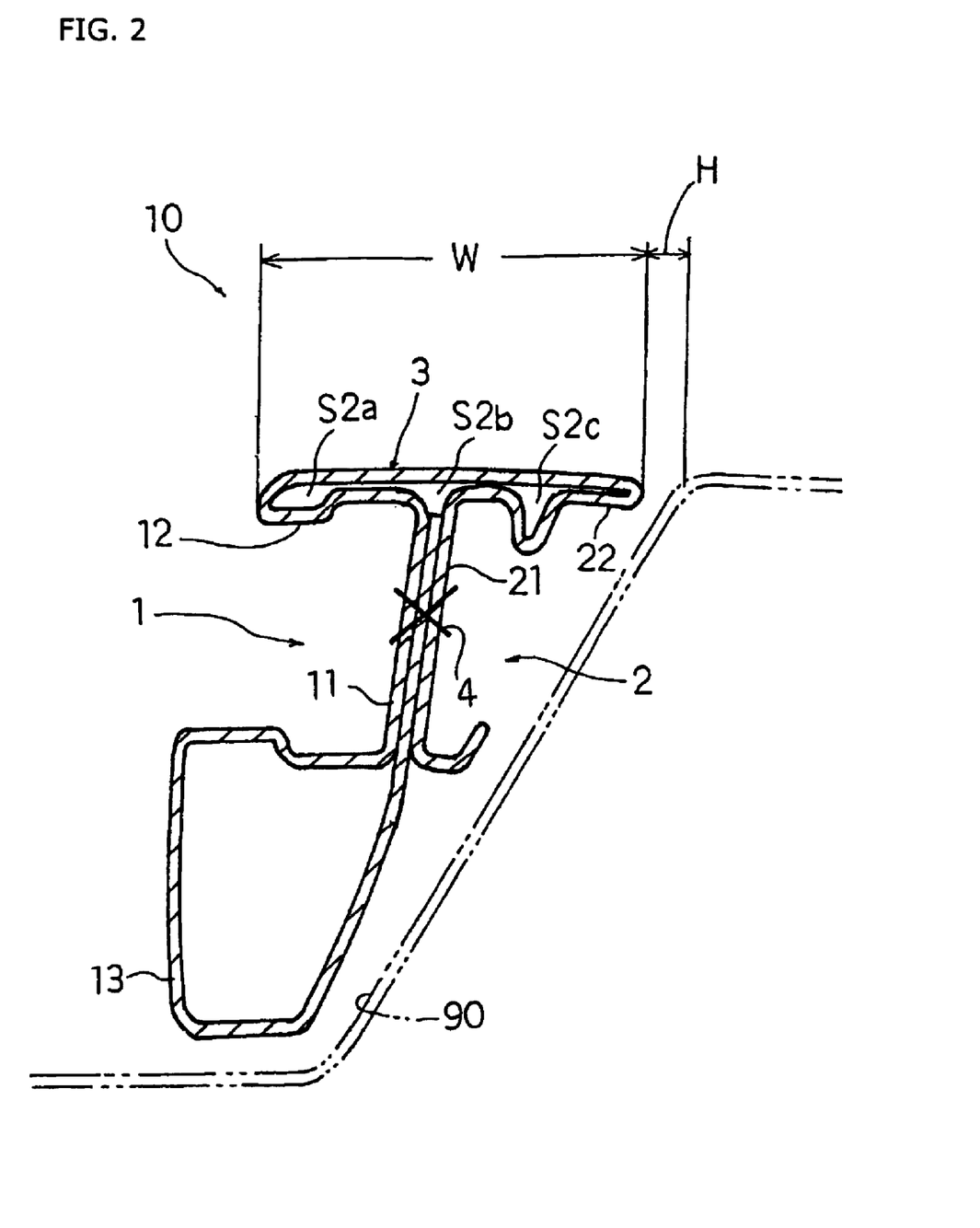
FIG. 2 is a view showing a cross section of a first sash frame as a base material, and a gap formed between a door provided with a first door sash formed of the first sash frame and a door stop of a vehicle.

The manufacturing method of the first vehicular door sash provided with no sash molding (lower-cost type), based on which the door sash with the sash molding (luxury type) is manufactured will be described in detail. Referring to FIG. 1, the strip sheet M is subjected to the roll molding step through the first roll molding unit B, and further to the welding step through the welding unit C so as to be formed into the first sash frame 10 having a predetermined cross section. The thus formed first sash frame 10 is basically subjected to a predetermined bending process so as to be formed into the first vehicular door sash (lower-cost type) having a predetermined configuration. Upon installment of a vehicle door provided with the first vehicular door sash to a vehicle body, a predetermined gap (H) is formed between the vehicle door and a door stop 90 of a pillar or a roof of the vehicle as shown in FIG. 2.

The first sash frame 10 used for manufacturing the first vehicular door sash (lower-cost type) basically includes a groove portion 1 in which a glass-run channel 8 is retained, a retainer portion 2 having its bottom surface 21 fused with a bottom surface 11 of the groove portion 1 at a spot welding point 4 through the welding unit C for retaining a weather strip, a flange portion 3 having a width W, which connects a side wall 12 of the groove portion 1 to a side wall 22 of the retainer portion 2 so as to partially form an outer surface of the door, and a contact portion 13 formed on one side surface of the groove portion 1 in contact with the weather strip (not shown) provided in the door stop 90 of the vehicle.

Second Embodiment

Figure 3:
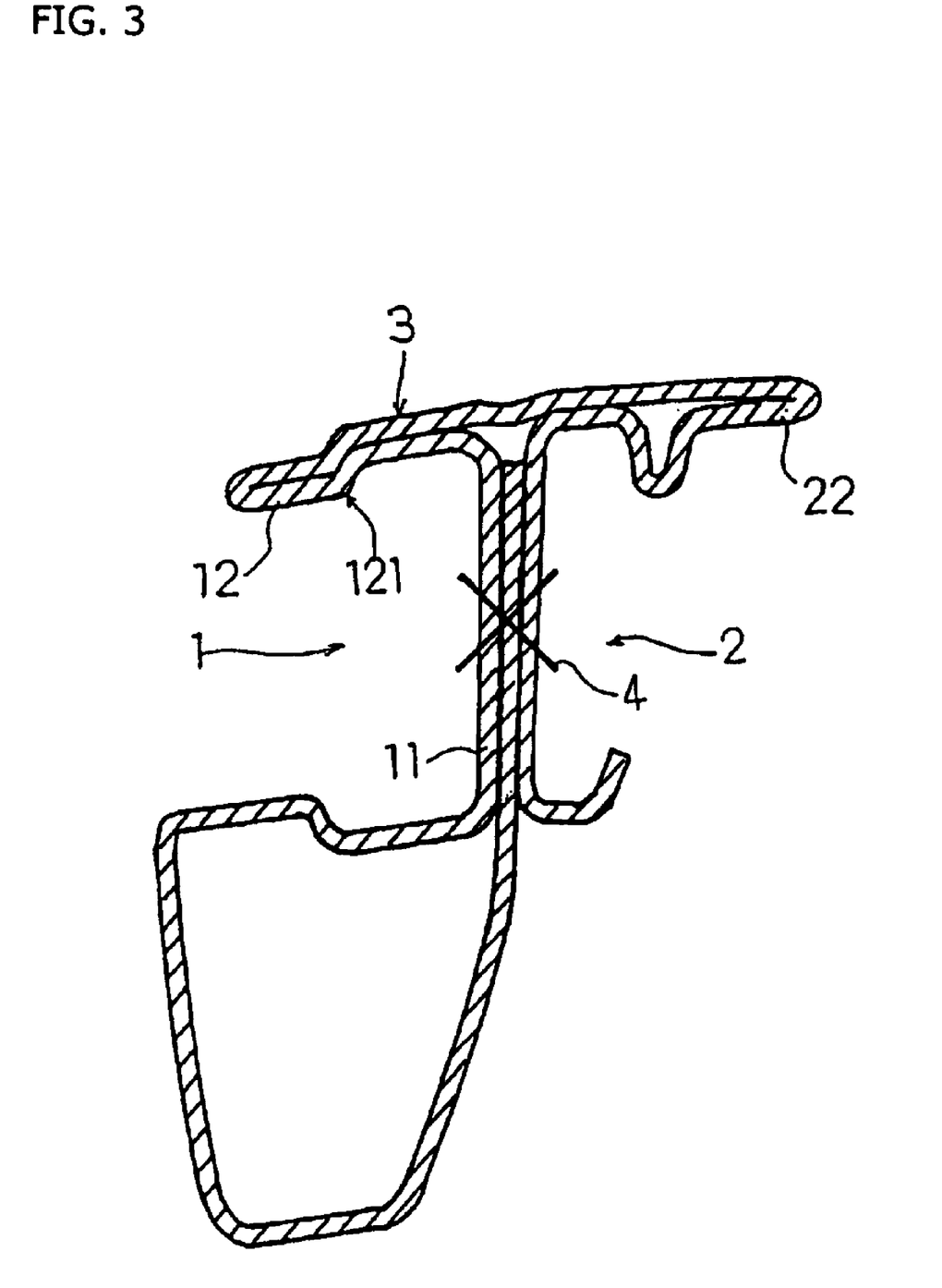
FIG. 3 is a cross section of a semi-finished sash frame in which a flange portion is partially compressed by a first stage roller in the additional molding step.
Figure 4:
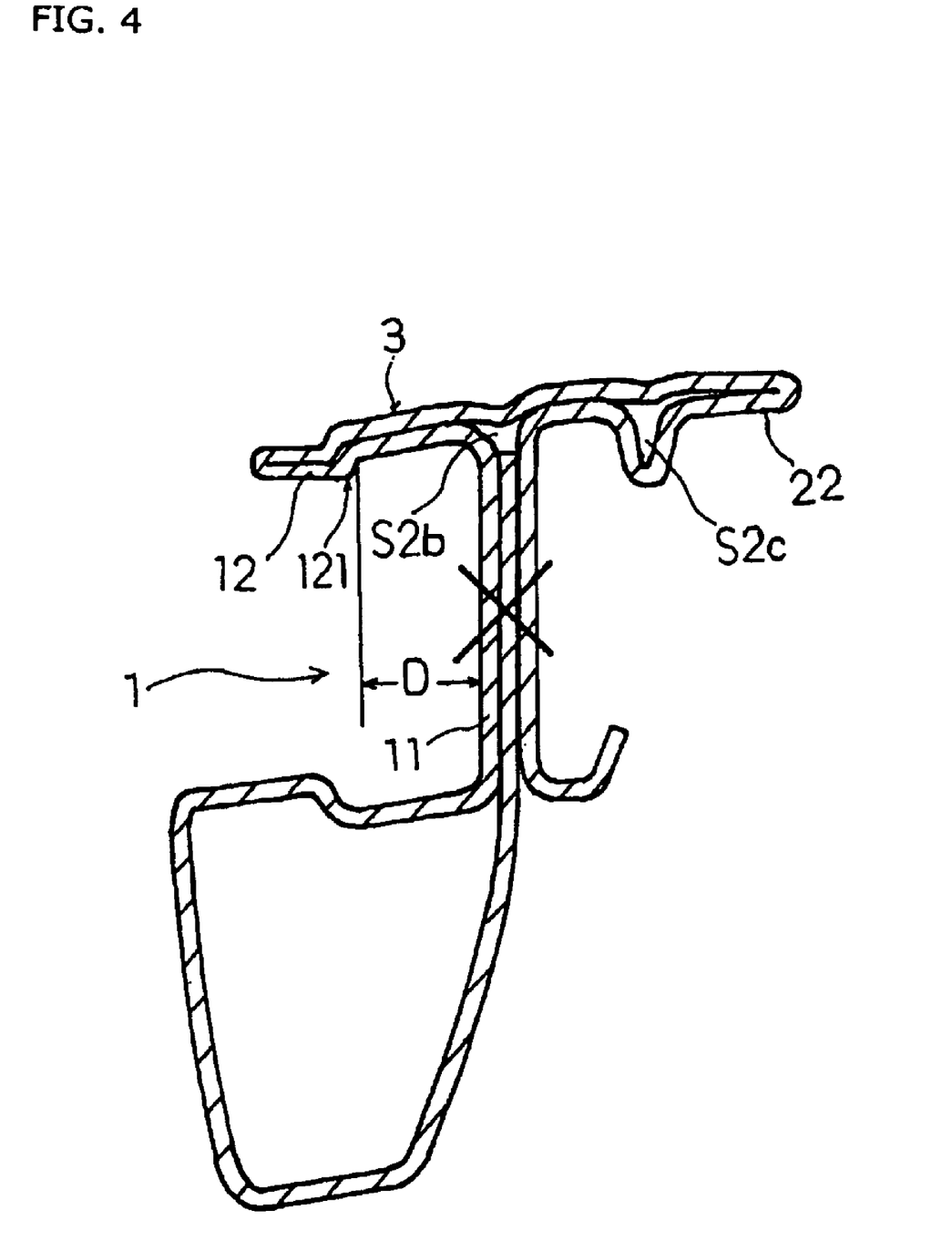
FIG. 4 is a cross section of the semi-finished sash frame in which the flange portion is further compressed by a second stage roller.

The manufacturing method of the second sash frame 20 used for manufacturing the vehicular door sash provided with the sash molding (luxury type) (see FIG. 6) will be described referring to FIGS. 3 to 6. Basically the first sash frame 10 is subjected to the manufacturing method of the second sash frame 20. Referring to FIG. 1, the first sash frame 10 that has been subjected to the process through the welding unit C is further fed to the process through the second roll molding unit D as indicated by the chain double-dashed line. The second roll molding unit D is formed of three-stage rollers of D1, D2, and D3 in the order from the front side as shown in FIG. 1. When the first sash frame 10 having the cross section as shown in FIG. 2 is fed into the thus structured second roll molding unit D, the flange portion 3 of the first sash frame 10 is compressed under pressure as shown in FIG. 3. That is, a space S2a as shown in FIG. 2 is compressed under pressure such that an end portion 12 as a lower portion of the flange portion 3 at the side of the groove portion 1 is tightly fit with the upper portion of the flange portion 3. The whole surface of the flange portion 3 is pressed against the groove portion 1 and the retainer portion 2 so as to be in tight fit therewith (see FIG. 3).

Figure 5:
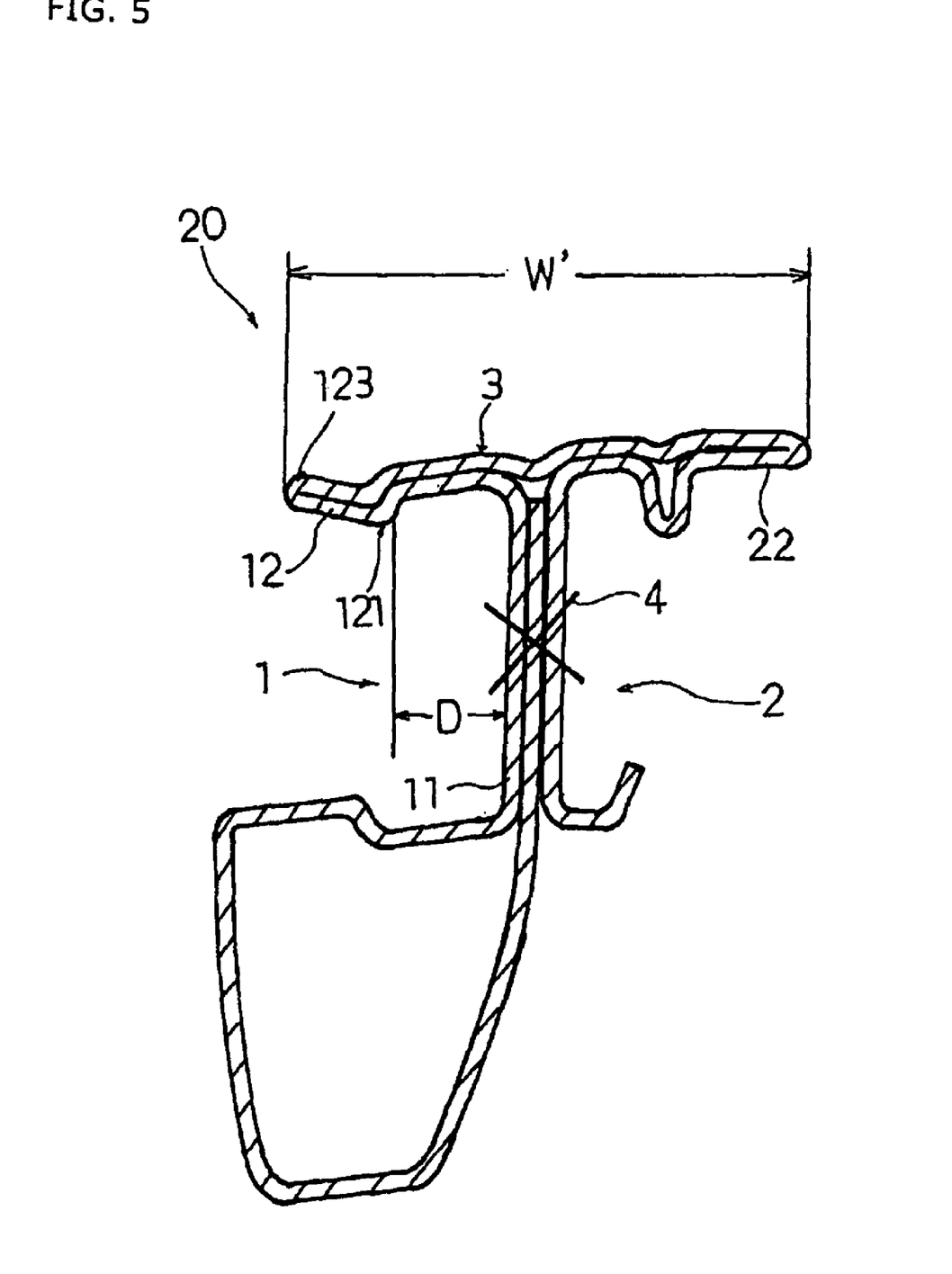
FIG. 5 is a cross section of a second sash frame in the state where the flange portion is bent by the third stage roller.
Figure 6:
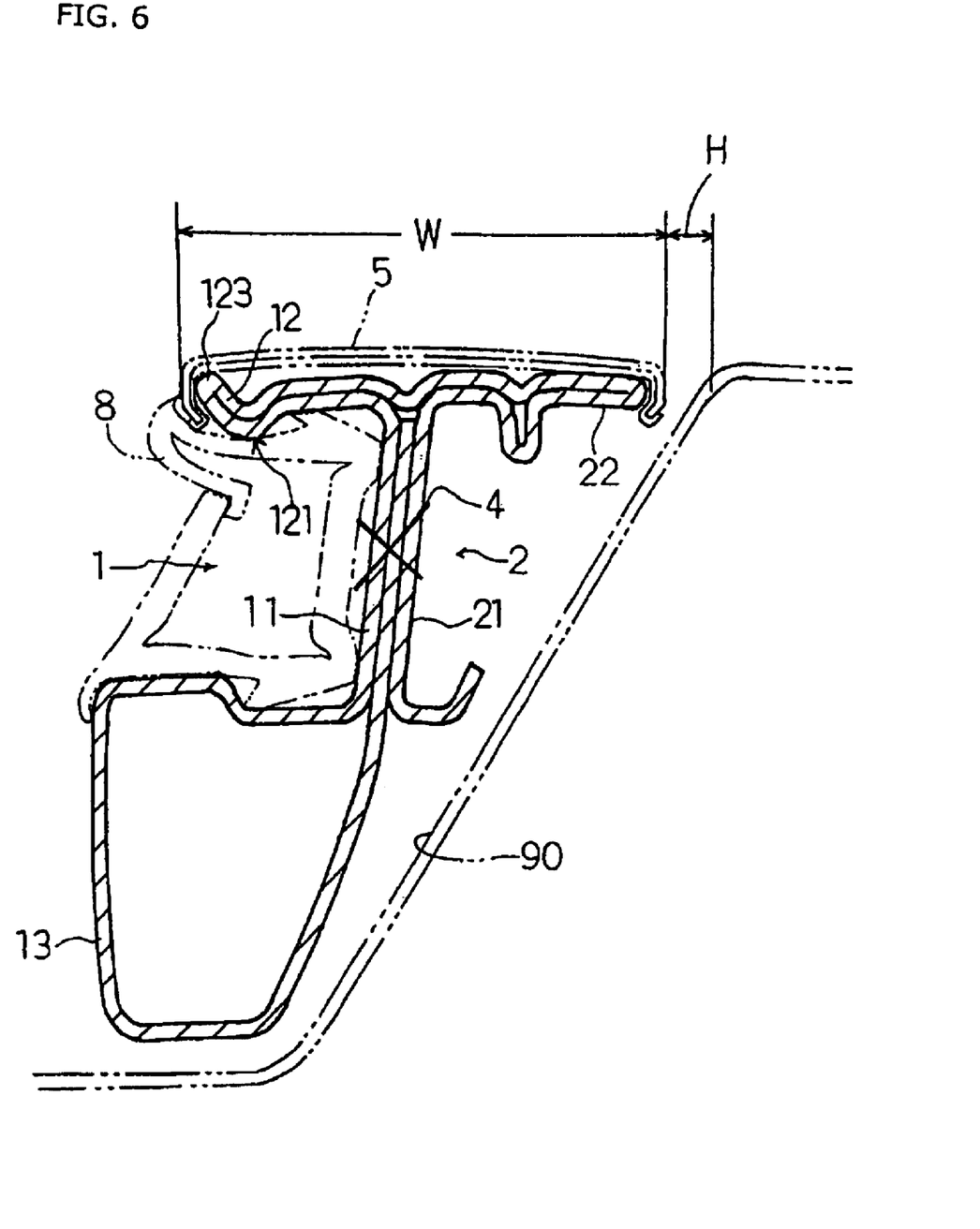
FIG. 6 is a view showing a cross section of the second sash frame, and a gap formed between a door provided with a second door sash formed of the second sash frame and the door stop.

When the semi-finished sash frame in the aforementioned state is further fed into the second stage roller D2, the surface of the flange portion 3 of the semi-finished sash frame is further compressed. More specifically, each space S2b and S2c formed at the back surface of the flange portion 3 shown in FIG. 2 is further compressed under pressure such that the flange portion 3 is further brought into the tight fit state (see FIG. 4). A protruding portion 121 is formed on the inner surface of the flange portion 3 at the side of the groove portion 1 for retaining the glass-run channel 8 apart from the bottom surface 11 of the groove portion 1 by D. The protruding portion 121 serves to retain the glass-run channel 8 in the groove portion 1 (see FIG. 6). When the semi-finished sash frame is further fed into the third stage roller D3, the end portion 12 of the flange portion 3 at the side of the groove portion 1 is bent upward as shown in FIG. 5. That is, the third stage roller D3 serves to perform the bending process. The thus bent end portion of the flange portion 3 has a cross section directed upward as shown in FIGS. 5 and 6. The tip end portion directed upward forms an engagement portion 123 to which the sash molding 5 is attached. The resultant second sash frame 20 that has been subjected to the bending process has the flange portion 3 with the width W' that is smaller than the width (W) of the flange of the first sash frame 10. In other words, the relationship W>W' is established.

The thus formed second sash frame 20 of luxury type (with sash molding) is subjected to a predetermined bending process so as to be formed into a sash assembly having a predetermined configuration. The sash molding 5 for decorative purpose is attached onto the surface of the flange portion 3 that constitutes the sash assembly in the state where its one end is engaged with the engagement portion 123 as shown in FIG. 6. The second vehicular door sash is thus produced. The width of the door sash at the side of the flange portion 3, that is, its width in the state where the sash molding 5 is attached has the same value as that of the first vehicular door sash, that is, W (see FIG. 6). As a result, the gap between the end of the sash molding 5 for the vehicular door and the door stop 90 of the vehicle has the same value, that is, H as that in case of the first vehicular door sash.

In the embodiment, only the flange portion 3 of the first sash frame 10 (of lower-cost type with no sash molding) is subjected to the additional simple molding process including the compressing step and bending step using the roll molding unit D so as to efficiently manufacture two types of the sash frames 10 and 20 each having the different flange width. The sash molding 5 for decorative purpose is attached to the flange portion 3 of the sash frame 20, which has the reduced width such that the door sash of luxury type is efficiently manufactured. Upon installment of the door provided with the door sash (luxury type) to the vehicle body, the gap (H) between the outer frame of the flange 3 or the end of the sash molding 5 of the door sash and the door stop portion 90 of the vehicle body is substantially the same as that generated in case of the door sash with no sash molding (lower-cost type). Accordingly, this makes it possible to have no difference in the appearance between the luxury type and the lower-cost type of the vehicular door sash.

In the embodiments of the invention, the sash frame 10 is basically produced through the roll molding means. The process of producing the sash frame 10, however, is not limited as aforementioned. For example, the sash frame formed by producing the groove portion 1 and the retainer portion 2 as individual members, and integrating them through the hemming process unit may be employed.

The end portion 12 of the flange portion 3 to be compressed is formed by compressing the space S2a at the side of the groove portion 1. Alternatively, it may be bent after compressing the space S2c at the side of the retainer portion 2, or each space S2a and S2c may be compressed simultaneously and then bent.

LISTING OF ELEMENTS

1 GROOVE PORTION
11 BOTTOM SURFACE
12 SIDE WALL
121 PROTRUDING PORTION
123 ENGAGEMENT PORTION
13 CONTACT PORTION
2 RETAINER PORTION
21 BOTTOM SURFACE
22 SIDE WALL
3 FLANGE PORTION
4 SPOT WELDING PORTION
5 SASH MOLDING
8 GLASS-RUN CHANNEL
10 FIRST SASH FRAME
20 SECOND SASH FRAME
A UNCOILER UNIT
B FIRST ROLL MOLDING UNIT
C WELDING UNIT
D SECOND ROLL MOLDING UNIT
D1 FIRST STAGE ROLLER
D2 SECOND STAGE ROLLER
D3 THIRD STAGE ROLLER
E CUTTING UNIT
H GAP
S2a SPACE
S2b SPACE
S2c SPACE
T FEED UNIT
W WIDTH OF FLANGE
W" WIDTH OF FLANGE

The invention claimed is:
1. A vehicular door sash comprising a sash frame, the sash frame comprising:
   a groove portion for retaining a glass-run channel;
   a retainer portion for retaining a weather strip, having a bottom surface in contact with a bottom surface of the groove portion; and
   a flange portion that connects the retainer portion and the groove portion and partially forms an outer surface of a door of a vehicle;
   wherein the flange portion has a first width,
   wherein the flange portion is compressed to a second width by a roll molding process which transforms an outer surface of the flange portion into an undulating outer surface, the second width being less than the first width, wherein an end portion of the compressed flange portion of the sash frame adjacent the groove portion forms an engagement portion having a cross section directed upward such that a sash molding is attachable to the engagement portion for covering the compressed flange portion, wherein a protruding portion is formed by the flange portion of the sash frame and a side wall of said groove portion during the roll molding process, said protruding portion being directed inwardly towards the groove portion and engages with a portion of the glass-run channel retained in the groove portion so as to hold the glass-run channel therein, wherein said first width is the same as a width of the sash molding, and wherein a gap formed between a door stop of the vehicle and an end portion of the flange portion opposite the groove portion when the flange portion in has the first width is equal in length to a gap formed between the door stop and an end portion of the sash molding opposite the groove portion when the compressed flange portion having the second width is covered by the sash molding.

2. A method of manufacturing a vehicular door sash, the method comprising:

molding a metal sheet in a roll molding unit to form a sash frame, the sash frame comprising:
  a groove portion for retaining a glass-run channel;
  a retainer portion for retaining a weather strip, the retainer portion having a bottom surface in contact with a bottom surface of the groove portion; and
  a flange portion having a first width and connecting the retainer portion and the groove portion and partially forms an outer surface of a door of a vehicle; and compressing the flange portion to a second width which transforms an outer surface of the flange portion into an undulating outer surface and transforms a portion of the flange portion into a protruding portion that together with a side wall of the groove portion holds the glass-run channel in the groove position and into an engagement portion engageable with a sash molding, wherein the first width of the flange portion is the same as a width of the sash molding that covers the flange portion having said second width and said second width is less than said first width.

* * * * *

UNITED STATES PATENT AND TRADEMARK OFFICE
CERTIFICATE OF CORRECTION

PATENT NO. : 7,762,021 B2  Page 1 of 1
APPLICATION NO. : 10/554832
DATED : July 27, 2010
INVENTOR(S) : Tsuyoshi Fujiwara et al.

It is certified that error appears in the above-identified patent and that said Letters Patent is hereby corrected as shown below:

In Claim 1, Column 7, line 20, the words "flange portion in has" should read --flange portion has--.

Signed and Sealed this

Twenty-third Day of November, 2010

David J. Kappos
*Director of the United States Patent and Trademark Office*